(12) United States Patent
Lai et al.

(10) Patent No.: US 11,315,231 B2
(45) Date of Patent: Apr. 26, 2022

(54) INDUSTRIAL IMAGE INSPECTION METHOD AND SYSTEM AND COMPUTER READABLE RECORDING MEDIUM

(71) Applicant: INDUSTRIAL TECHNOLOGY RESEARCH INSTITUTE, Hsinchu (TW)

(72) Inventors: Yu-Ting Lai, Taitung (TW); Jwu-Sheng Hu, Zhubei (TW); Ya-Hui Tsai, Taoyuan (TW); Keng-Hao Chang, Taichung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 152 days.

(21) Appl. No.: 16/217,904

(22) Filed: Dec. 12, 2018

(65) Prior Publication Data
US 2019/0378263 A1 Dec. 12, 2019

Related U.S. Application Data

(60) Provisional application No. 62/682,253, filed on Jun. 8, 2018.

(30) Foreign Application Priority Data

Oct. 2, 2018 (TW) .................. 107134854

(51) Int. Cl.
*G06T 7/00* (2017.01)
*G06K 9/62* (2022.01)

(52) U.S. Cl.
CPC ............ *G06T 7/0004* (2013.01); *G06K 9/627* (2013.01); *G06K 9/6215* (2013.01); *G06K 9/6259* (2013.01); *G06T 2207/20081* (2013.01)

(58) Field of Classification Search
CPC ........ G06T 7/0004; G06T 2207/20081; G06K 9/6215; G06K 9/6259; G06K 9/627
(Continued)

(56) References Cited

U.S. PATENT DOCUMENTS 8,688,274 B2 4/2014 Shieh et al.
9,046,496 B2 6/2015 Tsai et al.
(Continued)

FOREIGN PATENT DOCUMENTS

CN 101419671 A 4/2009
CN 101539930 A 9/2009
(Continued)

OTHER PUBLICATIONS

U.S. Office Action, dated Aug. 14, 2019, for U.S. Appl. No. 15/846,886.
(Continued)

*Primary Examiner* — Srilakshmi K Kumar
*Assistant Examiner* — Umair Ahsan
(74) *Attorney, Agent, or Firm* — Birch, Stewart, Kolasch & Birch, LLP

(57) ABSTRACT

An industrial image inspection method includes: generating a test latent vector of a test image; measuring a distance between a training latent vector of a normal image and the test latent vector of the test image; and judging whether the test image is normal or defected according to the distance between the training latent vector of the normal image and the test latent vector of the test image.

13 Claims, 3 Drawing Sheets

(58) Field of Classification Search
USPC .................................................... 382/141
See application file for complete search history.

(56) References Cited

U.S. PATENT DOCUMENTS

| | | | |
|---|---|---|---|
| 9,310,316 | B2 | 4/2016 | Wu et al. |
| 9,349,098 | B1 | 5/2016 | Ionson |
| 9,645,097 | B2 | 5/2017 | Nicolaides et al. |
| 9,754,205 | B1 | 9/2017 | Brestoff |
| 9,864,912 | B2 | 1/2018 | Min et al. |
| 2002/0102018 | A1 | 8/2002 | Lin et al. |
| 2002/0165837 | A1 | 11/2002 | Zhang et al. |
| 2008/0281548 | A1 | 11/2008 | Algranati et al. |
| 2009/0279772 | A1 | 11/2009 | Sun et al. |
| 2013/0028487 | A1 | 1/2013 | Stager et al. |
| 2013/0208978 | A1 | 8/2013 | Ribnick et al. |
| 2016/0163035 | A1* | 6/2016 | Chang .................. G06T 7/0004 382/149 |
| 2017/0132801 | A1* | 5/2017 | Trenholm ............... G06T 7/514 |
| 2017/0284896 | A1 | 10/2017 | Harpale et al. |
| 2017/0351952 | A1 | 12/2017 | Zhang et al. |
| 2019/0108396 | A1* | 4/2019 | Dal Mutto .............. G06T 7/174 |
| 2019/0295302 | A1* | 9/2019 | Fu ......................... G06T 7/0002 |
| 2019/0362191 | A1* | 11/2019 | Lin ..................... G06F 16/5854 |

FOREIGN PATENT DOCUMENTS

| | | |
|---|---|---|
| CN | 101692224 A | 4/2010 |
| CN | 102208038 A | 10/2011 |
| CN | 102314614 A | 1/2012 |
| CN | 101536011 B | 1/2013 |
| CN | 102999762 A | 3/2013 |
| CN | 103177265 A | 6/2013 |
| CN | 103294716 A | 9/2013 |
| CN | 103345645 A | 10/2013 |
| CN | 104670896 A | 6/2015 |
| CN | 105184298 A | 12/2015 |
| CN | 105277567 A | 1/2016 |
| CN | 105854598 A | 2/2016 |
| CN | 105608690 A | 5/2016 |
| CN | 107328787 A | 11/2017 |
| CN | 107392896 A | 11/2017 |
| CN | 107451994 A | 12/2017 |
| CN | 107507126 A | 12/2017 |
| CN | 107527318 A | 12/2017 |
| CN | 107909153 A | 4/2018 |
| CN | 107977629 A | 5/2018 |
| TW | I480508 B | 4/2015 |
| TW | I493153 B | 7/2015 |
| TW | I517101 B | 1/2016 |
| TW | I525317 B | 3/2016 |
| TW | 201621754 A | 6/2016 |
| TW | I576708 B | 4/2017 |
| TW | 201734825 A | 10/2017 |
| TW | 201734888 A | 10/2017 |
| TW | 201800983 A | 1/2018 |

OTHER PUBLICATIONS

Cha et al. "Deep Learning-Based Crack Damage Detection Using Convolutional Neural Networks", Computer-Aided Civil and Infrastructure Engineering, 32, (2017), 361-378.
Hu et al. "Efficient human detection in crowded environment", Multimedia Systems, (2015), 21:177-187.
Huang et al. "Automated visual inspection in the semiconductor industry: A survey". Computers in Industry, 66, (2015), 1-10.
Kim et al. "Transfer Learning for Automated Optical Inspection", IEEE 2017, p. 2517-2524.
Kuo et al. "Unsupervised Semantic Feature Discovery for Image Object Retrieval and Tag Refinement", IEEE Transactions on Multimedia, vol. 14, No. 4, Aug. 2012, p. 1079-1090.
Lai et al. "A Texture Generation Approach for Detection of Novel Surface Defects", IEEE, total 6 pages.
Lai et al. "Industrial Anomaly Detection and One-class Classification using Generative Adversarial Networks", total 6 pages.
Luo "Perspective-Aware Warping for Seamless Stereoscopic Image Cloning", total 8 pages.
Office Action for TW 106137265 dated May 25, 2018.
Ren et al. "A Generic Deep-Learning-Based Approach for Automated Surface Inspection", IEEE Transactions on Cybernetics, vol. 48, No. 3, Mar. 2018, p. 929-940.
Richter et al. "On the Development of Intelligent Optical Inspections", European Union 2017, total 6 pages.
Schlegl et al. "Unsupervised Anomaly Detection with Generative Adversarial Networks to Guide Marker Discovery", IPMI 2017, total 12 pages.
Tsai et al. "Learning and Recognition of On-Premise Signs from Weakly Labeled Street View images", IEEE Transactions on Image Processing, vol. 23, No. 3, Mar. 2014, p. 1047-1059.
You et al. "AttachedShock: Design of a crossing-based target selection technique on augmented reality devices and its implications", Int. j. Human-Computer Studies, 72, (2014), 606-626.
Chinese Office Action and Search Report for Chinese Application No. 201711131911.8, dated Jun. 28, 2020.
Chinese Office Action and Search Report for Chinese Application No. 201910008430.0, dated Oct. 9, 2021.
Author Unknown "Research on Improved Primary Color Extraction Method and Adaptive Weight Image Retrieval Algorithm", Master Thesis, Mar. 15, 2016, total 4 pages, with an English abstract.
Chinese Office Action and Search Report for Chinese Application No. 201711131911.8 dated Aug. 25, 2021.

* cited by examiner

INDUSTRIAL IMAGE INSPECTION METHOD AND SYSTEM AND COMPUTER READABLE RECORDING MEDIUM

This application claims the benefit of U.S. provisional application Ser. No. 62/682,253, filed Jun. 8, 2018 and the benefit of Taiwan application Serial No. 107134854, filed Oct. 2, 2018, the subject matters of which are incorporated herein by references.

TECHNICAL FIELD

This disclosure relates to an industrial image inspection method, an industrial image inspection system and a computer readable recording medium, and more particularly to an unsupervised industrial image inspection method, an unsupervised industrial image inspection system and a computer readable recording medium based on a generative adversarial network (GAN).

BACKGROUND

With the industrial automation and the products changing with each passing day, the number of products to be inspected is also growing high. An automated optical inspection (AOI) system utilizes the machine vision as the inspection technology, and can be used to replace the conventional manpower inspection. In the industrial process, the AOI can obtain the surface state of the product, and then the computer image processing technology is used to detect the defects such as foreign matters, abnormal patterns or the like.

After the AOI machine has performed the automatic inspection, the inspectors still need to perform the artificial reconsideration work, so that the required number for the inspectors is high and the prior training of the inspectors become more complicated. Furthermore, the defects of the industrial image usually need to be artificially labeled and classified. However, if the defects have the small variation and cannot be easily discovered, the labeling yield is affected. Recently, the artificial intelligence rises, and the convolution neural network (CNN) is effectively applied to the classification on the image. However, the classification of the defects still needs to be labeled in advance, so that the training process becomes longer and longer.

Thus, how to make the industrial image inspection process become more efficient is still one of the efforts of the industry.

SUMMARY

The disclosure is directed to an industrial image inspection method, an industrial image inspection system and a computer readable recording medium.

According to one embodiment, an industrial image inspection method is provided. The method includes: generating a test latent vector of a test image; measuring a distance between a training latent vector of a normal image and the test latent vector of the test image; and judging whether the test image is normal or defected according to the distance between the training latent vector of the normal image and the test latent vector of the test image.

According to another embodiment, an industrial image inspection system is provided. The industrial image inspection system includes: an automated optical inspection apparatus performing automated optical inspection on a plurality of samples; and an image inspection module coupled to the automated optical inspection apparatus. The image inspection module is configured to: generate a test latent vector of a test image outputted from the automated optical inspection apparatus; measure a distance between a training latent vector of a normal image and the test latent vector of the test image; and judge whether the test image is normal or defected according to the distance between the training latent vector of the normal image and the test latent vector of the test image.

According to an alternative embodiment, a computer readable recording medium capable of executing the above-mentioned industrial image inspection method when being loaded and executed by an industrial image inspection system.

Figure 1:
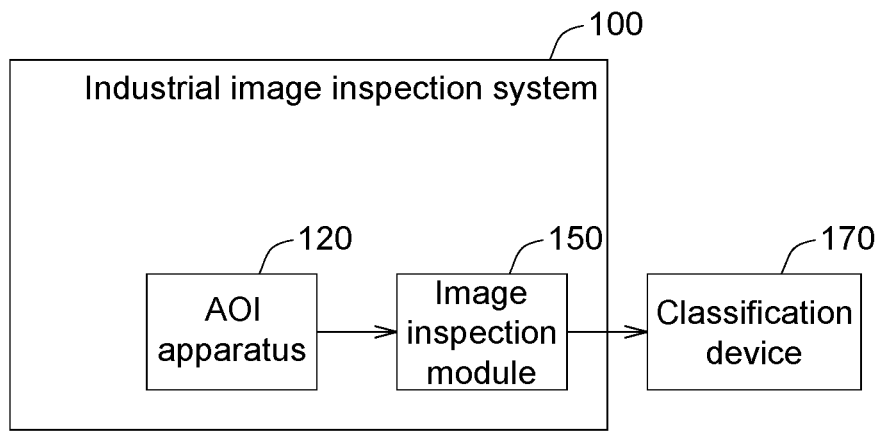
FIG. 1 is a schematic functional block diagram showing an industrial image inspection system according to an embodiment of this disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

The technical terms of this specification refer to the idioms in the technical field. If some terms are explained or defined in this specification, then the interpretations of the portions of the terms are based on the descriptions or definitions of this specification. Each embodiment of this disclosure has one or more technical features. Under the precondition of the possible implementation, those skilled in the art can selectively implement some or all of the technical features of any embodiment, or some or all of the technical features of these embodiments can be optionally combined.

FIG. 1 is a schematic functional block diagram showing an industrial image inspection system according to an embodiment of this disclosure. In FIG. 1, an industrial image inspection system 100 includes an automated optical inspection (AOI) apparatus 120 and an image inspection module 150. Inspection/classification results generated by the image inspection module 150 are transmitted to a classification device 170 for classification.

The AOI apparatus 120 includes, for example, AOI image processing software, an AOI sensor system, an AOI inspection machine and the like. The architecture of the AOI apparatus 120 in the embodiment of this disclosure is not particularly restricted. The AOI apparatus 120 may perform AOI on multiple samples.

The image inspection module 150 may be coupled to the AOI apparatus 120 and perform the defect-over-kill reconsideration function. The image inspection module 150 may perform generative adversarial network (GAN) associated functions. The image inspection module 150 may be implemented by a processor or the like.

For example, a classification device 170 is used to transport each sample, after being classified, to the respective classification area for the use in the subsequent sample process, the sample defect repair, the sample waste treatment or the like. The classification device 170 includes, for example, an arbitrary combination of a pneumatic cylinder, a conveyor belt, a cantilever mechanism, a robot arm, a stage and the like. The architecture of the classification device 170 in the embodiment of this disclosure is not particularly restricted.

In addition, although the image inspection module 150 follows the AOI apparatus 120 in FIG. 1, the image inspection module may also not follow the AOI apparatus in other embodiments of this disclosure. That is, the image inspection module may perform its own defect inspection, and this also falls within the spirit of this disclosure.

Figure 2:
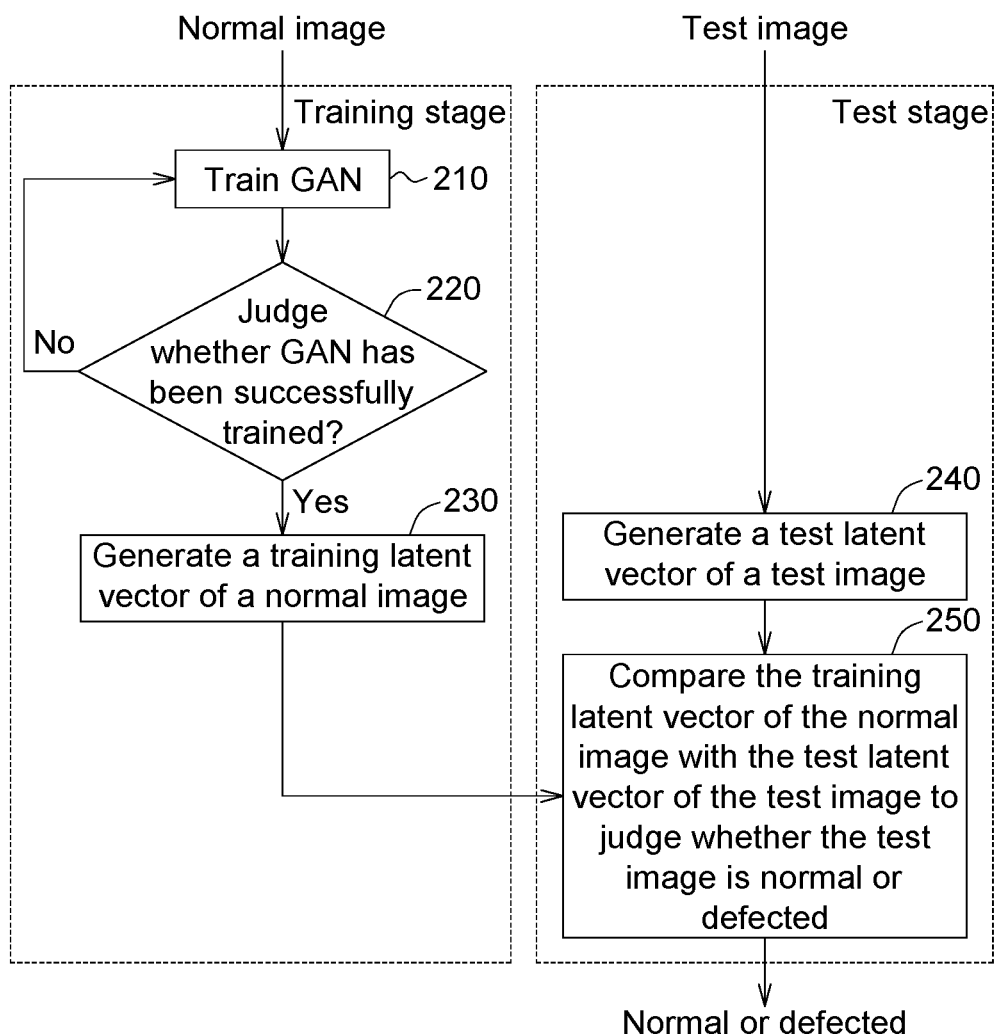
FIG. 2 shows an image inspection process of an image inspection module according to an embodiment of this disclosure.

FIG. 2 shows an image inspection process of an image inspection module according to an embodiment of this disclosure. As shown in FIG. 2, in step 210, a normal image is utilized to train the GAN (i.e., to train the generator of the image inspection module 150 in FIG. 1), wherein the "normal image" refers to the normal image obtained from previous inspection results (i.e., the successful normal image obtained after the machine or artificial inspection).

In step 220, it is judged whether the GAN (or generator) has been successfully trained or not. If not, then the process returns to the step 210 to train the GAN (or generator) again (e.g., more normal images are utilized to train the GAN (or generator)).

In step 230, a latent vector of the normal image (also referred to as a training latent vector) is obtained, and the details thereof will be explained herein below.

In step 240, a latent vector of a test image (also referred to as a test latent vector) is obtained, and the details thereof will be explained herein below, wherein the "test image" refers to the image on the inspection line or after being inspected by the AOI apparatus 120.

In step 250, the training latent vector of the normal image is compared with the test latent vector of the test image to judge whether the test image is normal or defected. For example, the step 250 is to measure a distance between the training latent vector of the normal image and the test latent vector of the test image. If the distance is smaller than a threshold value, then it represents that the test image is normal; or otherwise it represents that the test image is defected.

Figure 3:
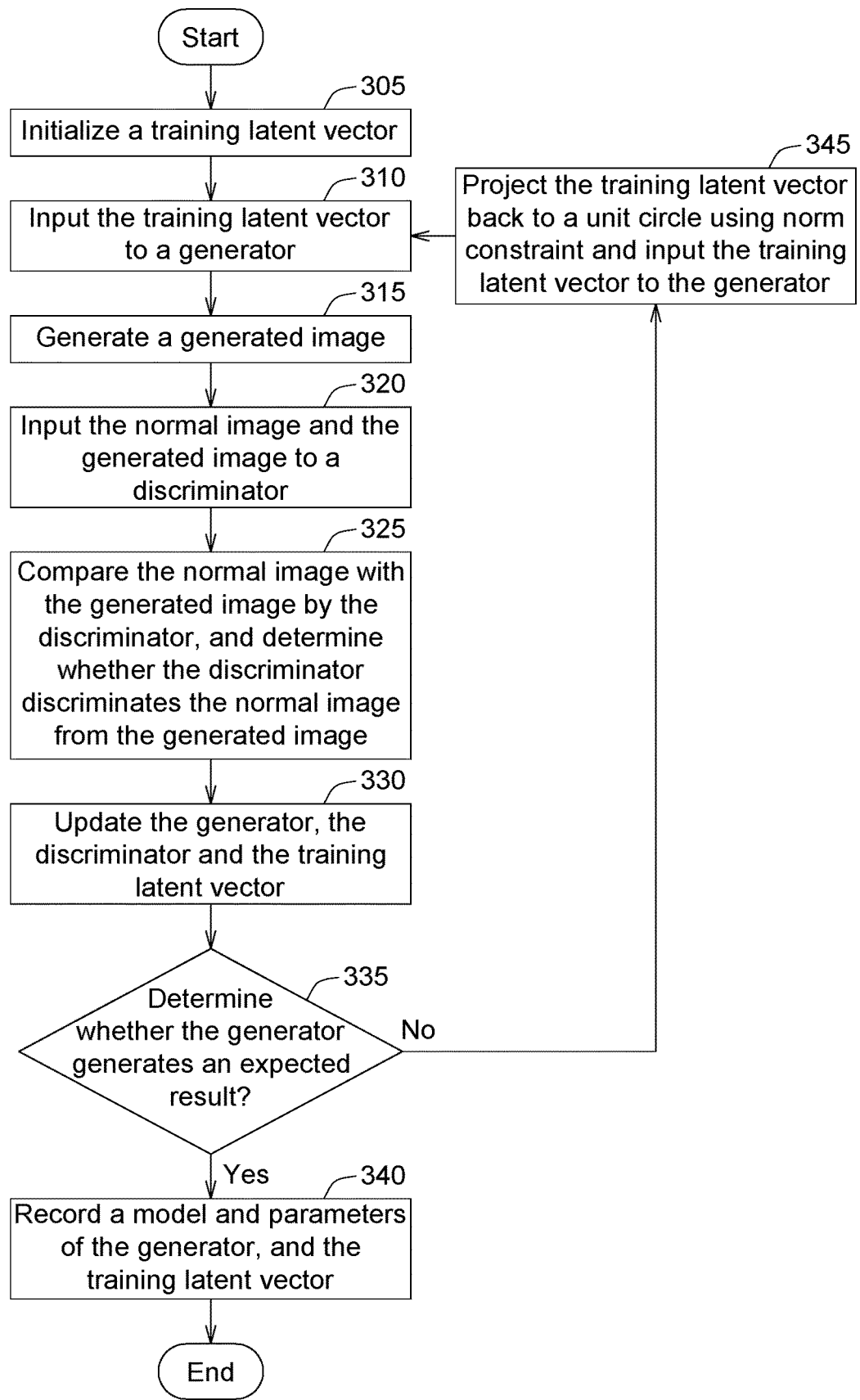
FIG. 3 is a flow chart showing a training stage according to an embodiment of this disclosure.

Please refer to FIG. 3. FIG. 3 is a flow chart showing a training stage according to an embodiment of this disclosure. In step 305, the latent vector is initialized within the set latent space. For example, the latent vector is generated randomly using Gaussian distribution from a unit circle, which is set by the designer and can be changed according to needs.

In step 310, the latent vector (or referred to as the training latent vector) is inputted to the generator of the image inspection module 150.

In step 315, the generator of the image inspection module 150 generates the corresponding generated image according to the latent vector. The generator is to make the generated image closer to the normal image. In the embodiment of this disclosure, in step 320, the normal image and the generated image are inputted to a discriminator of the image inspection module 150. In step 325, the discriminator compares the normal image with the generated image, and it is determined whether the discriminator has discriminated the normal image from the generated image. The details in the step 325 are described in the following example. After the discriminator has compared the normal image with the generated image, the discriminator generates a predicted label. If the discriminator determines that the generated image is close to the normal image, then the predicted label generated by the discriminator is normal (real). On the contrary, if the discriminator determines that the generated image is not close (i.e. not similar) to the normal image, then the predicted label generated by the discriminator gets failed. The predicted label generated by the discriminator may be compared with the ground truth label, and the value of the ground truth label is one of real and failure. If the predicted label generated by the discriminator matches with the ground truth label, then it represents that the comparing result of the discriminator is correct at this time. On the contrary, if the predicted label generated by the discriminator does not match with the ground truth label, then it represents that the comparing result of the discriminator fails at this time.

In the embodiment of this disclosure, the counterbalanced training is performed on the generator and the discriminator. That is, the generator needs to generate the generated image closer to the normal image, so that the discriminator cannot discriminate the generated image from the normal image. On the other hand, the discriminator is more able to discriminate the normal image from the generated image. This counterbalanced training can be expressed as a loss function in a mathematical equation.

In step 330, the loss function of the GAN is calculated according to a labeling difference (i.e., a difference between the predicted label and the ground truth label), and the generator, the discriminator and the latent vector are updated using the stochastic gradient descent (SGD). The operation in the step 330 is also referred to as a "minimized objective function method", an "optimizer" or an "optimization algorithm".

In step 335, whether the generator generates an expected result is verified. For example, the mean-square error (MSE), the structural similarity index (SSIM index), t-distributed Stochastic Neighbor Embedding (t-SNE) or the like is used to verify whether the generator can generate the expected result or not.

If the judged result in the step 335 is affirmative (the generator can generate the expected result), then a model and parameters of the generator and the training-completed latent vector (may be referred to as the training latent vector) are recorded in the step 340. In the step 340, the training latent vector and a mean and a variance ($\mu 1$, $c1$) of the training latent vector are recorded together. Then, the training process ends.

If the judged result in the step 335 is negative (the generator cannot generate the expected result), then the latent vector is projected back to the unit circle using norm constraint, and the obtained latent vector is inputted to the generator to continue training the generator in step 345. The norm constraint projection may be the L2 projection, L1 projection, L infinite projection or other similar methods. The latent vector obtained in the L2 projection can be expressed as follows:

$z/\mathrm{sqrt}(\mathrm{sum}(z^2))$, where $z$ is the latent vector, and sum ($z^2$) represents the sum, and sqrt represents the square root.

In the step 345, the reason of projecting the latent vector back to the unit circle using L2 is that the latent vector is updated by using the stochastic gradient descent (SGD) in the embodiment of this disclosure, and this makes the latent vector exceed the range of the originally set latent space and is disadvantageous to the subsequent inspection. Therefore, the latent vector exceeding the range is projected back to the range of the originally set latent space using the norm constraint of L2.

The generator may be trained through the process of FIG. 3, and the latent vector of the normal image (also referred to as the training latent vector of the normal image) may be obtained.

Figure 4:
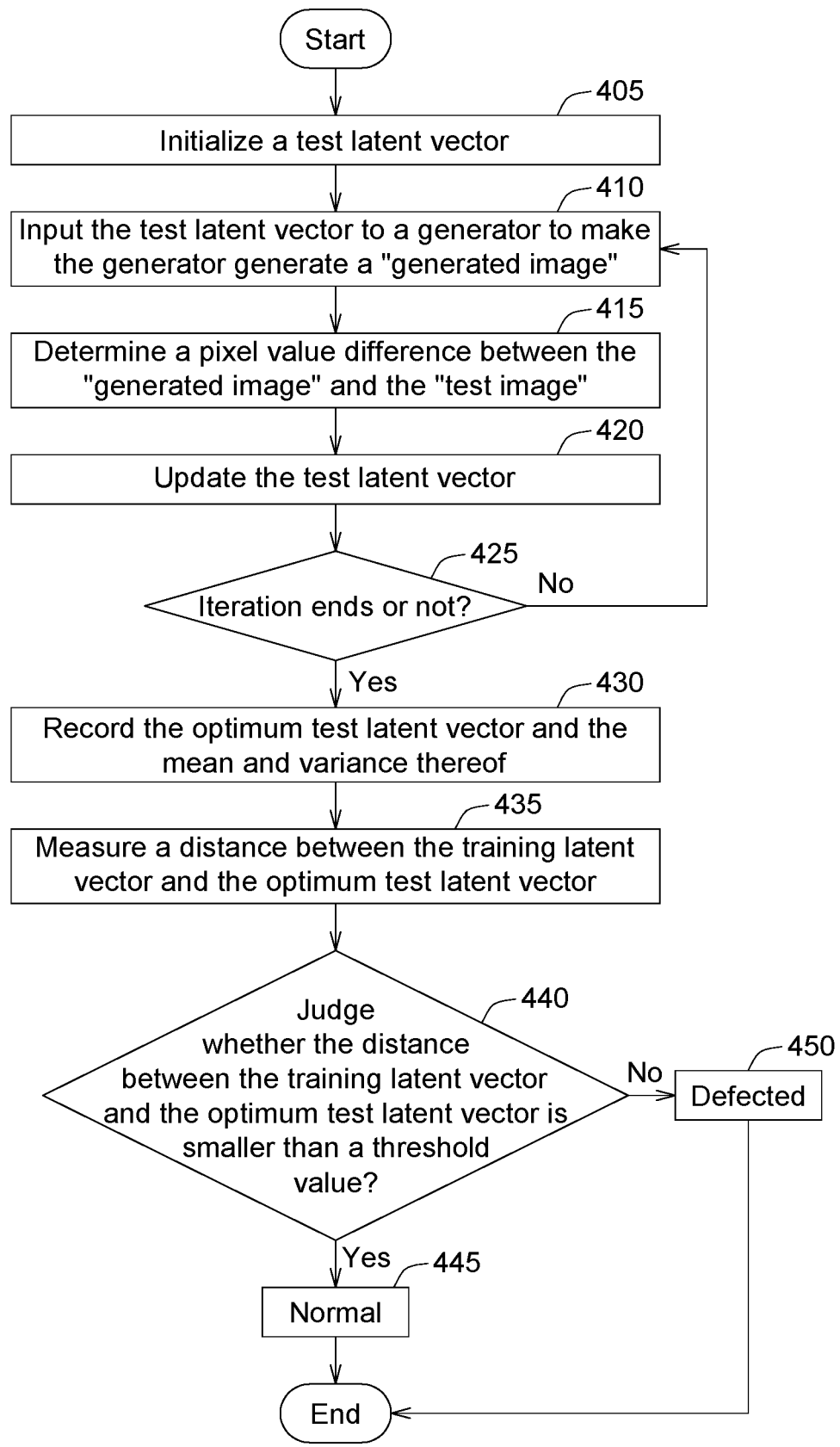
FIG. 4 is a flow chart showing a test stage according to an embodiment of this disclosure.

How the embodiment of this disclosure performs the test stage will be explained. Please refer to FIG. 4. FIG. 4 is a flow chart showing a test stage according to an embodiment of this disclosure.

As shown in FIG. 4, in step 405, the latent vector is initialized within the set latent space (because the latent vector is used in the test stage, it is also referred to as the test latent vector). For example, the (test) latent vector is generated randomly using Gaussian distribution from a unit circle, which is set by the designer and can be changed according to needs.

In step 410, the (test) latent vector is inputted to the generator of the image inspection module 150 to make the generator generate the "generated image". In step 415, a difference between the "generated image" and the "test image" is determined by way of comparison. For example, a pixel value difference between the "generated image" and the "test image" is determined by way of comparison, and the details thereof will not be repeated here. In an embodiment of this disclosure, the model and the parameters of the generator need to be fixed in the test stage.

In step 420, a loss function is calculated according to the pixel value difference between the "generated image" and the "test image", and the (test) latent vector is updated using the stochastic gradient descent.

In step 425, whether the iteration has ended (i.e., whether the optimum (test) latent vector has been generated) is judged. If the judged result in the step 425 is negative (the optimum (test) latent vector has not been generated yet), then the process returns to the step 410, and the updated (test) latent vector is inputted to the generator to make the generator generate the "generated image" again.

If the judged result in the step 425 is affirmative (the optimum (test) latent vector has been generated), the optimum (test) latent vector and its mean and variance ($\mu_2$, $c_2$) are recorded in step 430.

In step 435, a distance between the training latent vector (obtained in the training stage) and the optimum (test) latent vector (obtained in the test stage) is measured. The details of the step 435 will be described in the following example. The "multivariate Gaussian (normal) distribution" is utilized to measure the distance between the training latent vector (obtained in the training stage) and the optimum (test) latent vector (obtained in the test stage), and the equation thereof is expressed as follows:

$$d^2((\mu_1,c_1),(\mu_2,c_2))=\|\mu_1-\mu_2\|_2^2+Tr(c_1+c_2-2(c_1c_2)^{1/2}),$$

where Tr represents a trace number.

In step 440, whether the distance between the training latent vector (obtained in the training stage) and the optimum (test) latent vector (obtained in the test stage) is smaller than a threshold value is judged. If the judged result in the step 440 is affirmative, then it represents that the training latent vector (obtained in the training stage) is very close to the optimum (test) latent vector (obtained in the test stage). That is, it represents that the distribution situation of the "generated image" generated by the generator is very close to the distribution situation of the "test image", so the test image is judged as pertaining to the normal product (step 445). On the contrary, if the judged result in the step 440 is negative, then it represents the training latent vector (obtained in the training stage) is not close to the optimum (test) latent vector (obtained in the test stage). That is, it represents that the distribution situation of the "generated image" generated by the generator is not close to the distribution situation of the "test image", so the test image is judged as pertaining to the defective product (step 450).

A computer readable recording medium is disclosed in another embodiment of this disclosure. When the computer readable recording medium is loaded and executed by an industrial image inspection system, the industrial image inspection method as described above may be performed.

For the test stage, sometimes the defective product cannot be directly discriminated from the image space. Therefore, in the embodiment of this disclosure, using the test process in FIG. 4 can separate the images, which cannot be originally classified, in the latent space so that the defective product can be discriminated from the normal product in the latent space.

In addition, the embodiment of this disclosure may use the 2D photographing device to obtain the 2D image for training (i.e., may use the trained model to perform the test process) without additional hardware apparatuses being provided. The embodiment of this disclosure can perform the recursive deep learning to decrease the over kill rate. The embodiment of this disclosure may be applied to the optical inspection application, such as the industrial inspection, metal machining inspection, inspections of components of cars and motorcycles, textile inspection, printing inspection, medical and hardware inspection industries, in associated manufacturing industries.

As mentioned hereinabove, the embodiment of this disclosure discloses the technological means of generating the GAN to learn the normal image, wherein the GAN can be utilized to precisely learn the property of image distribution. The generator is trained using the single class of dataset, and the training latent vector is recorded. The embodiment of this disclosure further uses the norm constraint in the latent space in the training stage to achieve the effect of restricting the latent vector. In the test stage, (test) latent vector of the test image is optimized. The defect can be inspected by comparing the (training) latent vector of the normal image with the (test) latent vector of the test image.

In addition, the embodiment of this disclosure pertains to the unsupervised learning, does not need the additional labeling defect dataset, can solve the drawback of repeatedly adjusting the in the existing AOI algorithm, and can be widely applied to datasets with different attributes.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:
1. An industrial image inspection method, comprising:
generating a test latent vector of a test image;
measuring a distance between a training latent vector of a normal image and the test latent vector of the test image;
judging whether the test image is normal or defected according to the distance between the training latent vector of the normal image and the test latent vector of the test image; and recording an optimum test latent vector of the test image when it is judged that the test latent vector of the test image is optimum;

wherein when the distance between the training latent vector of the normal image and the optimum test latent vector of the test image is smaller than a threshold value, then the test image is judged as normal;

wherein in a training stage, calculating a first loss function of a generative adversarial network (GAN) according to a labeling difference, and updating a generator, a discriminator and the training latent vector of the normal image using a stochastic gradient descent (SGD), wherein the labeling difference is a difference between a predicted label and a ground truth label;

obtaining the training latent vector of the normal image when the generator is successfully trained; and projecting the training latent vector back to a unit circle using norm constraint, and inputting the obtained training latent vector to the generator to continue training the generator when the generator fails to generate an expected result; and wherein the step of generating the test latent vector of the test image comprises:

initializing the test latent vector of the test image;

inputting the test latent vector of the test image to the generator to make the generator generate the generated image;

determining a pixel value difference between the generated image and the test image; and calculating a second loss function according to the pixel value difference between the generated image and the test image, and updating the test latent vector of the test image using the SGD.

2. The industrial image inspection method according to claim 1, wherein the step of generating the test latent vector of the test image further comprises:

inputting the updated test latent vector of the test image to the generator to make the generator generate the generated image again when it is judged that the test latent vector of the test image is not optimum; and recording a mean and a variance of the test latent vector when it is judged that the test latent vector of the test image is optimum.

3. The industrial image inspection method according to claim 2, wherein when the test latent vector of the test image is initialized, the test latent vector of the test image is randomly generated using Gaussian distribution from the unit circle.

4. The industrial image inspection method according to claim 2, wherein the step of measuring the distance between the training latent vector of the normal image and the test latent vector of the test image comprises: measuring the distance between the training latent vector of the normal image and the optimum test latent vector of the test image according to the mean and the variance of the test latent vector, and a mean and a variance of the training latent vector.

5. The industrial image inspection method according to claim 2, wherein when the distance between the training latent vector of the normal image and the test latent vector of the test image is not smaller than the threshold value, then the test image is judged as defected.

6. The industrial image inspection method according to claim 1, further comprising: in the training stage, initializing the training latent vector of the normal image;

inputting the training latent vector of the normal image to the generator to make the generator generate the generated image;

inputting the normal image and the generated image to the discriminator;

comparing, by the discriminator, the normal image with the generated image, and determining whether the discriminator discriminates the normal image from the generated image or not; and recording a model and parameters of the generator, the training latent vector of the normal image, and a mean and a variance of the training latent vector when the generator generates the expected result.

7. A computer readable non-transitory recording medium capable of executing the industrial image inspection method according to claim 1 when being loaded and executed by an industrial image inspection system.

8. An industrial image inspection system, comprising:

an automated optical inspection apparatus performing automated optical inspection on a plurality of samples; and an image inspection module, coupled to the automated optical inspection apparatus and configured to:

generate a test latent vector of a test image outputted from the automated optical inspection apparatus;

measure a distance between a training latent vector of a normal image and the test latent vector of the test image;

judge whether the test image is normal or defected according to the distance between the training latent vector of the normal image and the test latent vector of the test image; and record an optimum test latent vector of the test image when it is judged that the test latent vector of the test image is optimum;

wherein when the distance between the training latent vector of the normal image and the optimum test latent vector of the test image is smaller than a threshold value, then the image inspection module judges the test image as normal;

wherein the image inspection module is configured to, in a training stage:

calculate a first loss function of a generative adversarial network (GAN) according to a labeling difference, and update a generator of the image inspection module, a discriminator of the image inspection module and the training latent vector of the normal image using a stochastic gradient descent (SGD), wherein the labeling difference is a difference between a predicted label and a ground truth label;

obtain the training latent vector of the normal image when the generator is successfully trained; and project the training latent vector back to a unit circle using norm constraint, and input the obtained training latent vector to the generator to continue training the generator when the generator fails to generate an expected result; and wherein the image inspection module is configured to, in a test stage:

initialize the test latent vector of the test image;

input the test latent vector of the test image to the generator of the image inspection module to make the generator generate the generated image;

determine a pixel value difference between the generated image and the test image; and calculate a second loss function of the GAN according to the pixel value difference between the generated image and the test image, and update the test latent vector of the test image using the SGD.

9. The industrial image inspection system according to claim 8, wherein the image inspection module is further configured to:
- input the updated test latent vector of the test image to the generator to make the generator generate the generated image again when it is judged that the test latent vector of the test image is not optimum; and
- record a mean and a variance of the test latent vector when it is judged that the test latent vector of the test image is optimum.

10. The industrial image inspection system according to claim 9, wherein when the test latent vector of the test image is initialized, the image inspection module randomly generates the test latent vector of the test image using Gaussian distribution from the unit circle.

11. The industrial image inspection system according to claim 9, wherein the image inspection module measures the distance between the training latent vector of the normal image and the optimum test latent vector of the test image according to the mean and the variance of the test latent vector, and a mean and a variance of the training latent vector.

12. The industrial image inspection system according to claim 9, wherein when the distance between the training latent vector of the normal image and the test latent vector of the test image is not smaller than the threshold value, then the image inspection module judges the test image as defected.

13. The industrial image inspection system according to claim 8, wherein the image inspection module is further configured to, in the training stage:
- initialize the training latent vector of the normal image;
- input the training latent vector of the normal image to the generator of the image inspection module to make the generator generate the generated image;
- input the normal image together with the generated image to the discriminator of the image inspection module;
- compare, by the discriminator, the normal image with the generated image, and determine whether the discriminator discriminates the normal image from the generated image or not; and
- record a model and parameters of the generator, the training latent vector of the normal image, and a mean and a variance of the training latent vector when the generator generates the expected result.

* * * * *